United States Patent Office 3,351,635
Patented Nov. 7, 1967

3,351,635
EPOXIDATION PROCESS
John Kollar, Wallington, N.J., assignor to Halcon International, Inc., a corporation of Delaware
No Drawing. Filed Mar. 14, 1966, Ser. No. 536,179
9 Claims. (Cl. 260—348.5)

This case is a continuation-in-part of copending applications Ser. No. 248,284 filed Dec. 31, 1962, Ser. No. 251,053 filed Jan. 14, 1963, Ser. No. 264,034 filed Mar. 11, 1963, Ser. No. 336,150 filed Jan. 7, 1964, Ser. No. 431,202 filed Feb. 8, 1965, Ser. No. 410,009 filed Nov. 9, 1964, Ser. No. 375,309 filed June 15, 1964, Ser. No. 366,170 filed May 8, 1964, Ser. No. 370,107 filed May 25, 1964, Ser. No. 375,313 filed June 15, 1964, Ser. No. 375,258 filed June 15, 1964, all abandoned, and Ser. No. 414,575 filed Nov. 30, 1964.

This invention relates to the epoxidation of olefinically unsaturated organic compounds, to the corresponding oxirane compounds and is particularly concerned with the catalytic epoxidation of olefinically unsaturated organic compounds using organic hydroperoxides as epoxidizing agents.

PRIOR WORK

The general field of the epoxidation of olefins to oxirane compounds has long occupied persons skilled in the chemical arts.

It is known that olefins have greatly varying reactivity depending upon the size and structure. For example, D. Swern discusses the relative reactivities of olefins toward epoxidation in J.A.C.S. 69, 1962 (1947). Typically, the generalized comparative reactivities of olefins to epoxidation are:

*Relative rates of epoxidation*

| | |
|---|---|
| $CH_2=CH_2$ | 1 |
| $RCH=CH_2$ | 24 |
| $RCH=CHR$ | 500 |
| $R_2C=CH_2$ | 500 |
| $R_2C=CHR$ | 6500 |
| $R_2C=CR_2$ | Very great |

From this it can be seen that ethylene, and then olefins like propylene, are the most difficult of all olefins to epoxidize.

Prior workers have discovered that ethylene can be converted to ethylene oxide by vapor phase partial oxidation with molecular oxygen over a silver catalyst, and this is the method used for substantially all the commercial production of ethylene oxide. U.S. Patent 2,693,474 is illustrative of these successful efforts to prepare ethylene oxide.

However, the catalytic vapor phase molecular oxygen oxidation techniques are not applicable to the other olefins even including the adjacent compound, propylene, which is the next most important commercial compound. In fact, the commercial production of propylene oxide mainly is accomplished by the cumbersome chlorohydrin route which comprises reacting propylene with hypochlorous acid to form propylene chlorohydrin and the dehydrochlorination of the propylene chlorohydrin to propylene oxide.

In light of the complexity and cost of the chlorohydrin route, workers have turned to other possible routes for the epoxidation of propylene and other olefins. One route which has proved successful insofar as being capable of actually producing at least limited yields of propylene oxide and other oxides is the peracid route. This route involves the formation of a peracid, such as peracetic acid, through the reaction of hydrogen peroxide with the organic acid and the epoxidation of an olefin with the peracid. The disadvantages of the peracid route also are such as to preclude significant commercialization. The peracids themselves are extremely hazardous to handle and give rise to severe operation problems. The reagents are expensive, corrosive, and non-regenerable inasmuch as the hydrogen peroxide is lost as water. The composition of the peracid epoxidation mixture contains chemicals ($H_2O$, AcOH, and $H_2SO_4$) which are highly reactive with the product epoxides, thus leading to many by-products (glycol, glycol monoester, glycol diester) which lower the overall efficiency. This problem becomes more severe with the less reactive olefins, in particular propylene.

The above techniques proving less than satisfactory, research workers investigated other possible routes, especially for the production of the important and valuable propylene oxide. Attempts were made to utilize hydrogen peroxide in epoxidations. Hydrogen peroxide had long been known as a hydroxylation agent for converting compounds having olefinic unsaturation to alpha-beta dihydroxy compounds. Osmium tetraoxide has traditionally been employed as the catalyst to effect hydroxylation of olefins by hydrogen peroxide. $MnO_2$ has also been used. More recently workers found that various less reactive catalysts such as tungsten and molybdenum oxide enhance the hydroxylation of olefins. See U.S. Patents 2,613,223 and 2,754,325.

Neither osmium or manganese in any chemical forms has shown any catalytic effect, by the instant worker, in the epoxidation of olefins, regardless of reactivity, with hydroperoxides.

Thus, it can be seen that the hydroxylation reaction can not be equated to an epoxidation and the glycol product resulting from the hydroxylation is not practically convertible to the epoxide.

Later work by one of the inventors of U.S. Patent 2,754,325 as contained in U.S. Patent 2,786,854 reported that epoxides could be formed by reaction of olefins with hydrogen peroxide provided the reaction mixture was not exposed to a temperature in excess of 100° C. until all catalyst had been separated, or proviedd, where a hydroxy olefin is reacted, that a neutral salt of a tungstic acid is used. See U.S. Patent 2,833,788.

Hydrogen peroxide, however, is not effective in the epoxidation of olefins such as propylene as demonstrated subsequently by work done by the instant worker. Also, of course, hydrogen peroxide has the obvious disadvantages of cost and non-regenerability as well as water formation which causes product loss.

Some more recent work with exceedingly reactive, substituted olefins has reported the epoxidation of alpha-beta ethylenic ketones and aldehydes with organic hydroperoxides at carefully controlled pH conditions. See U.S. Patents 3,013,024 and 3,062,841.

Some older work, also with hydroperoxide was done. In a paper by Hawkins the low yield epoxidation of higher molecular weight and more reactive olefins with an organic hydroperoxide in the presence of vanadium pentoxide catalyst was described. Hawkins was able to obtain a yield of 36% of cyclohexene oxide from cyclohexene and cumene hydroperoxide. With less reactive octene-1 a yield of only 14% was obtained. After the discovery of the claimed catalysts in this patent application, Brill and Indicator have shown that with a less reactive hydroperoxide such as t-butyl hydroperoxide the epoxide of cyclohexene could be obtained in a 32% yield and octene-1 in a 10% yield in the complete absence of catalyst.

These facts demonstrate the need in the chemical field for more effective catalysts for use in epoxidizing olefins with hydroperoxides.

The use of hydroperoxides in the epoxidation of olefins such as propylene offers very important and distinct advantages over the use of chlorohydrin technology or over the use of peracids or hydrogen peroxide. Hydroperoxides are relatively inexpensive and convenient and safe to handle. In addition, hydroperoxides can readily be obtained and maintained in anhydrous form thus minimizing potential epoxide recovery and purification problems. Also as will later be developed, frequently the hydroperoxide can be converted into a derivative as a result of the epoxidation from which the hydroperoxide can be conveniently regenerated or which itself can be readily converted to other valuable products.

Despite the enormous expenditures of effort and money the convenient and efficient epoxidation of propylene eluded prior workers. The chlorohydrin process, while practised commercially, has such serious disadvantages as to have greatly held back propylene oxide development due to high product cost. The peracid route was not practical due to inherent process hazards and high cost. Hydrogen peroxide has not proved technically successful as a propylene epoxidation agent and hydroperoxides proved not to be effective when following the teachings of the prior art.

OBJECTS OF THE INVENTION

With the above in mind, it was the primary object of the present inventor to find an improved method for epoxidizing propylene and other olefinically unsaturated compounds to the oxirane derivatives. A special object was to find such an epoxidation process which employed organic hydroperoxides as the essential epoxidizing agent. Other objects can be seen from the following description of the invention.

THE INVENTION

Now, in accordance with the present invention a method has been discovered for the epoxidation of propylene as well as other olefinically unsaturated compounds to the corresponding oxirane derivatives employing organic hydroperoxides as the epoxidizing agents. Specifically, it has been found that these olefinically unsaturated materials can be successfully epoxidized conveniently and in exceedingly good yield through reaction with the organic hydroperoxides provided the reaction is carried out in the presence of certain catalytic materials as hereinafter described in particular detail. During the reaction, the hydroperoxide is converted almost quantitatively to the corresponding alcohol and it is within the scope of this invention to recover this alcohol as a coproduct of the process, or alternatively to convert the alcohol to a form for reuse in the process, or to convert the alcohol to another, more desirable coproduct.

OLEFINICALLY UNSATURATED REACTANTS

The need has long been greatest for a novel and successful route to propylene oxide through the epoxidation of propylene. The present invention is uniquely adapted for this successful conversion of propylene to propylene oxide. However, in addition to propylene the reaction system of the present invention can also be applied generally to the epoxidation of olefinically unsaturated materials.

Olefinically unsaturated materials which are epoxidized in accordance with the invention include substituted and unsubstituted aliphatic and alicyclic olefins which may be hydrocarbons or esters or alcohols or ketones or ethers or the like. Preferred compounds are those having from about 2 to 30 carbon atoms, and preferably at least 3 carbon atoms. Illustrative olefins are ethylene, propylene, normal butylene, isobutylene, the pentenes, the methyl pentenes, the normal hexenes, the octenes, the dodecenes, cyclohexenes, methyl cyclohexene, butadiene, styrene, methyl styrene, vinyl toluene, vinylcyclohexene, the phenyl cyclohexenes, and the like. Olefins having halogen, oxygen, sulfur and the like containing substituents can be used. Such substituted olefins are illustrated by allyl alcohol, methallyl alcohol, cyclohexanol, diallyl ether, methyl methacrylate, methyl oleate, methyl vinyl ketone, allyl chloride, and the like. In general, all olefinic materials epoxidized by method previously employed can be epoxidized in accordance with this process including olefinically unsaturated polymers having up to about several thousand carbon atoms. Illustrative olefins are linseed oil, olive oil, soybean oil, cottonseed oil, tall oil glycerides, castor oil, corn oil, butyl-polyglycol esters of unsaturated fatty acids, liquid or solid polybutadiene, polyisoprene, unsaturated copolymers of ethylene and propylene including terpolymers thereof with cyclopentadiene and the like.

The lower olefins having about 3 or 4 carbon atoms in an aliphatic chain are advantageously epoxidized by this process. The class of olefins commonly termed alpha olefins or primary olefins are epoxidized in the particularly efficient manner by this process. It is known to the art that these primary olefins, e.g., propylene, butene-1, decene-1 hexadecene-1, etc. are much more difficultly epoxidized than other forms of olefins, excluding only ethylene. Other forms of olefins which are much more easily epoxidized are substituted olefins, alkenes with internal unsaturation, cycloalkenes and the like. For example, it has been found that cyclohexene is easily epoxidized with all of the metals cited in this disclosure. Reference is made to Table 1 for a demonstration of this fact. However, it has been discovered that three of the catalysts cited have particular utility in the epoxidation of a primary olefin such as propylene. These three catalysts are molybdenum, titanium, and tungsten. It has been discovered that their activity for epoxidation of the primary olefins is surprisingly high and can lead to high selectivity of propylene to propylene oxide. These high selectivities are obtained at high conversions of hydroperoxide, 50% or higher, which conversion levels are important for commercial utilization of this technology.

THE ORGANIC HYDROPEROXIDE REACTANT

The reaction of this invention is carried out broadly using an organic hydroperoxide reactant having the formula ROOH wherein R is an organic radical. In preferred practice R is a substituted or unsubstituted alkyl, cycloalkyl, aralkyl, aralkenyl, hydroxyaralkyl, cycloalkenyl, hydroxycycloalkyl, and the like radical having about 3 to 20 carbon atoms. R may be a heterocyclic radical.

Illustrative and preferred hydroperoxides are cumene hydroperoxide, ethylbenzene hydroperoxide, tertiary butyl hydroperoxide, cyclohexanone peroxide, tetralin hydroperoxide, methyl ethyl ketone peroxide, methylcyclohexene hydroperoxide, and the like as well as the hydroperoxides of toluene, p-ethyl toluene, isobutylbenzene, diisopropyl benzene, p-isopropyl toluene, o-xylene, m-xylene, p-xylene, phenyl cyclohexane, etc. A useful organic hydroperoxide compound for use in this invention is the peroxide product which is formed by the liquid phase molecular oxygen oxidation of cyclohexanol.

Particularly useful hydroperoxides are derived from alkylaromatic hydrocarbons having at least one hydrogen atom on a carbon adjacent to the ring. Alpha aralkyl hydrocarbons which are used in this invention have the general formula

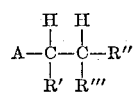

wherein each of R', R" and R'" can be hydrogen or an alkyl radical preferably having 1 to 20 carbon atoms, and A is an aromatic ring. The aromatic ring, A, may be that of benzene and may be substituted with fluoro, chloro, bromo, nitro, alkoxyl, acyl or carboxy (or esters thereof) groups. The ring may have one or more side chains with up to twelve carbon atoms in each chain, which chains may be branched. The alpha aralkyl hydroperoxides have the formula

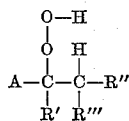

wherein R', R", R'" and A are as above mentioned. Examples are the hydroperoxides of toluene, ethylbenzene, cumene, p-ethyltoluene, isobutylbenzene, tetralin, diisopropylbenzene, p-isopropyltoluene, o-xylene, m-xylene, p-xylene, phenylcyclohexene, and the ilke. The preferred species are those derived from cumene, i.e. alpha, alpha dimethyl benzyl hydroperoxide, and ethyl benzene, i.e. alpha phenyl ethyl hydroperoxide. These aralkyl hydroperoxides give better reaction selectivities and faster reaction rates.

Most preferably, in the present invention the hydroperoxides are prepared through oxidation of the corresponding hydrocarbon. The oxidation is carried out using molecular oxygen as provided by air although pure oxygen as well as oxygen in admixture with inert gas in greater or lesser concentrations than air can be used. Oxidation temperatures broadly in the range 40° to 180° C., preferably 90° to 140° C. and pressure of 15 to 1,000 p.s.i.a. and preferably 30 to 150 p.s.i.a. can be used. The oxidation is continued until about 1 to 70%, and preferably about 10 to 50% of the alkylaromatic has been converted to the hydroperoxide.

Various additives of known type can be employed during the alkyl-aromatic oxidation to promote hydroperoxide production.

The hydrocarbon oxidation effluent comprises a solution of the hydroperoxide in hydrocarbon along with some alcohol formed during the oxidation. This effluent can be employed in the epoxidation without concentrating the hydroperoxide, or the oxidation effluent can be distilled to first concentrate the hydroperoxide.

THE CATALYST

The epoxidation reaction of this invention is carried out in the liquid phase in the presence of an effective dissolved catalytic amount of molybdenum, tungsten, titanium, columbium, tantalum, rhenium, selenium, chromium, zirconium, tellurium, or uranium catalyst.

The catalysts are suitably added as compounds of the above; it is possible, however, to add the catalyst as finely divided metal with the metal being eventually converted to a compound sufficiently soluble to provide a catalytic amount of the metal in solution in the reaction mixture.

The amount of metal in solution used as catalyst in the epoxidation process can be varied widey, athough as a rule it is desirable to use at least 0.00001 mol and preferably 0.002 to 0.03 mol per mol of hydroperoxide present. Amounts as low as 0.000001 mol per mol of hydroperoxide have an effect while amount greater than about 0.1 mol seem to give no advantage over smaller amounts, although amounts up to 1 mol or more per mol of hydroperoxide can be employed. The catalysts remain dissolved in the reaction mixture throughout the process and can be reused in the reaction after removal of the reaction products therefrom. The molybdenum compounds include the molybdenum organic salts, the oxides such as $Mo_2O_3$, $MoO_3$, molybdic acid, the molybdenum chlorides and oxychlorides, molybdenum fluoride, phosphate, sulfide, and the like. Hetero-polyacids containing molybdenum can be used as can salts thereof; examples include phosphomolybdic acid and the sodium and potassium salts thereof. Similar or analogous compounds of the other metals mentioned may be used, as may mixtures thereof.

The catalytic components may be employed in the epoxidation reaction in the form of a compound or mixture which is initially soluble in the reaction medium. While solubility will, to some extent depend on the particular reaction medium employed, a suitably soluble substance contemplated by the invention would include hydrocarbon soluble, organo-metallic compounds having a solubility in methanol at room temperature of at least 0.1 gram per liter. Illustrative soluble forms of the catalytic materials are the naphthenates, stearates, octoates, carbonyls and the like. Various chelates, association compound and enol salts, such, for examples, as aceto-acetonates may also be used. Specific and preferred catalytic compounds of this type for use in the invention are the naphthenates and carbonyls of molybdenum, titanium, tungsten, rhenium, columbium, tantalum, selenium, chromium, zirconium, tellurium and uranium. Alkoxy compounds such as tetrabutyl titanate and like tetra alkyl titanates are very useful.

Molybdenum, tungsten and titanium form an outstanding and preferred subgroup of catalysts since these catalysts are exceptionally useful in the epoxidation of primary olefins such as propylene as well as all of the other olefins.

A second subgroup which is not quite as useful with primary olefins as the above but which is quite useful with other olefin types is comprised of columbium, tantalum, rhenium and selenium.

The subgroup comprised of chromium, zirconium, tellurium and uranium is least useful of the enumerated catalysts.

It is advantageous to employ basic substances such as alkali metal compounds or alkaline earth metal compounds with the catalyst. Particularly preferred are the compounds of sodium, potassium, lithium, calcium, magnesium, rubidium, cesium, strontium, and barium. Compounds which are employed are those which most preferably are soluble in the reaction medium. However, insoluble forms can be employed and are effective when dispersed in the reaction medium. Organic acid compounds such as a metal acetate, naphthenate, stearate, octoate, butyrate, and the like can be employed. Additionally inorganic salts such as Na carbonate, Mg carbonate, trisodium phosphate, and the like can also be employed. Particularly preferred species of metal salts include sodium naphthenate, potassium, stearate, magnesium carbonate, and the like. Hydroxides and oxides of alkali and alkali earth metal compounds can be used. Examples are NaOH, MgO, CaO, $Ca(OH)_2$, KOH, and the like, alkoxides, e.g. Na ethylate, K cumylate, Na phenate etc. can be used. Amides such as $NaNH_2$ can be used as can quaternary ammonium salts. In general, any compound of alkali or alkali earth metals giving a basic reaction in water can be used.

The basic compound is employed during the epoxidation reaction in amount of .05 to 10 moles/mol of epoxidation catalyst desirably 0.25 to 3.0 and preferably 0.50 to 1.50 moles/mol. It has been found that as a result of the incorporation of the basic compound in the reaction system, significantly improved efficiencies in the utilization of the organic hydroperoxides in the epoxidation is achieved.

That is, using the basic compound there results a higher yield of oxirane compound based on hydroperoxide consumed. Also, of the hydroperoxide consumed, a greater amount is reduced to the aclohol instead of other undesirable products through the invention.

Additionally through use of the basic compound it is possible to employ lower unsaturated compound to hydroperoxide ratios and thus to improve unsaturated compound conversions while retaining satisfactory high reaction selectivities.

REACTION CONDITIONS

The reaction conditions which are employed in the epoxidations of this invention can vary quite broadly.

Temperatures which can be employed in the present invention can vary quite widely depending upon the reactivity and other characteristics of the particular system. Temperatures broadly in the range of about −20 to 200° C., desirably 0 to 150° C., and preferably 50–120° C. can be employed. The reaction is carried out at pressure conditions sufficient to maintain a liquid phase. Although sub-atmospheric pressures can be employed, pressures usually in the range of about atmospheric to about 1,000 p.s.i.g. are most desirable.

In the oxidation of the olefinic substrate, the ratio of substrate to organic peroxy compounds can vary over a wide range. Generally, mol ratios of olefinic groups in the substrates to hydroperoxide broadly in the range of 0.5:1 to 100:1, desirably 1:1 to 20:1 and preferably 2:1 to 10:1 are employed.

The concentration of hydroperoxides in the substrate oxidation reaction mixture at the beginning of the reaction will normally be one percent or more although lesser concentrations will be effective and can be used.

The substrate oxidation reaction can be carried out in the presence of a solvent, and in fact, it is generally desirable that one be used. In general, aqueous solvents are not contemplated. Among the suitable substances are hydrocarbons, which may be aliphatic, naphthenic or aromatic, and the oxygenated derivatives of these hydrocarbons. Preferably, the solvent has the same carbon skeleton as the hydroperoxide used, so as to minimize or avoid solvent separation problems.

It is generally advantageous to carry out the reaction to achieve as high a hydroperoxide conversion as possible, preferably at least 50% and desirably at least 90%, consistent with reasonable selectivities. Reaction times ranging from a minute to many hours, preferably about 10 minutes to 10 hours are suitable, while 20 minutes to 3 hours are usually employed.

In a preferred method, the epoxidation reaction is carried out in a controlled manner such that during the reaction the ratio of unsaturated compound to epoxidizing agent present at any time in the reaction zone is greater than the ratio of the total unsaturated compound and epoxidizing agent fed to the zone.

In this method, the organic hydroperoxide epoxidizing agent is added incrementally to the reaction zone. The addition can be controlled at such a rate so that a significant amount of hydroperoxide has reacted prior to addition of the next increment. For this type of operation, each increment of epoxidizing agent thus reacts in an environment having a ratio of unsaturated compound to epoxidizing agent which is higher than the overall ratio of the amounts of these materials added to the reaction zone.

It is surprising and unexpected that this regulation of the epoxidation reaction results in improved results due to the incremental epoxidizing agent addition, since residence times are necessarily considerably longer. During the reaction there is a build-up of product epoxide concentration in the reaction mixture. Surprisingly, despite the great reactivity of the epoxides, the product epoxide is sufficiently stable in the reaction system even at the longer residence times such that the advantages achieved by the control of reactant ratios far outweighs the disadvantages of longer residence times at very reactive conditions.

A preferred method for practicing this method in a continuous manner involves the provision of an elongated reaction zone through which the reactants continuously pass. The unsaturated compound together with a portion of the total epoxidizing agent to be employed is introduced into the reactor inlet and the reaction zone is maintained at suitable epoxidizing conditions by the provision of indirect heating or cooling means. At spaced intervals along the reaction zone, additional epoxidizing agent is introduced. The reaction product mixture is withdrawn through the outlet and thereafter treated for the recovery of the various components. As few as one supplemental epoxidizing agent addition point up to as many as are economically feasible can be used. Usually no more than 20 addition points are economic. Suitable catalyst and solvent can all be added with the epoxidizing agent at any or all of the supplemental introduction points.

Batch techniques can be employed. The batch reactor is charged with unsaturated compound reactant. Catalyst and solvent are also suitably charged to the reactor together with a portion of the total epoxidizing agent to be used, and the material in the reactor is brought to reaction temperature as by indirect heat exchange. Thereafter, during a reaction cycle, additional epoxidizing agent is introduced into the reaction zone. This additional epoxidizing agent can be continuously added at a controlled rate during all or part of the reaction or it can be added portionwise at intervals. Additional catalyst and other agents can also be added as needed or desired during the reaction. At the completion of the desired reaction, the product mixture is withdrawn and treated for the recovery of desired components.

It will be apparent that other techniques are possible for carrying out this method. For example, in a continuous system a column-type reactor with upward and downward flow can be employed with the addition of epoxidizing agent at various levels. A series of separate reactors can be employed with epoxidizing agent addition to each reactor. Many other methods are possible.

CO-PRODUCTS

A great advantage of this invention is the fact that during the epoxidation reaction the organic hydroperoxide, ROOH, is converted almost quantitatively to the corresponding alcohol, ROH. This alcohol can, itself be recovered as a valuable coproduct of the process or reconverted to the hydroperoxide by procedures such as dehydration to olefin, hydrogenation of the olefin, and oxidation to hydroperoxide, or by hydrogenolysis to hydrocarbon followed by oxidation to hydroperoxide. Thus the epoxidizing agent is, during the epoxidation, converted to a product suitable for convenient regeneration of the hydroperoxide for further use.

In an outstanding procedure, wherein an aralkyl hydroperoxide is employed, the aralkanol formed is dehydrated to the corresponding styrene.

In this practice, the alpha aralkyl hydroperoxide which reacts to epoxidize the olefin is itself substantially quantitatively converted to the corresponding alpha aralkanol which has the formula

wherein R′, R″, R‴ and A have the aforementioned meaning. In accordance with this invention, the aralkanol is dehydrated to the corresponding styrene,

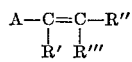

R′, R″, R‴ and A being as above.

Preferably, the epoxidation effluent is distilled in a series of distillation steps and/or in a multi-product column to isolate the various components, although other separation techniques can be employed. It is not necessary, although it is preferable, to separate the effluent components prior to the dehydration.

Prior to a distillation to separate the epoxidation effluent components it is frequently desirable, although not essential, to treat the effluent with a base, or with hydrogen, or with a chemical reducing agent in order to reduce the acid catalyst characteristics and avoid premature alcohol dehydration.

The aralkanol is then dehydrated to the corresponding styrene product, preferably in a catalytic dehydration although thermal dehydrations are possible and feasible.

The dehydration catalyst for making styrene may be used in supported form or in pellets. Typical supporting materials are crushed sandstone, silica, filter stone, and ceramically bonded, fused aluminium oxide. For instance, the support may be wetted with water, titania powder amounting to about 10 to 15 percent of the support then sprinkled on, and the catalyst and support dried at 150° C. The activity of the titania powder may be increased by treating it with hot aqueous sulfuric acid (e.g., 10 percent), followed by thorough washing with water to remove the acid, before the titania is applied to the support. With titania supported on 4 x 6 mesh, ceramically-bonded, fused aluminum oxide, production ratios of 400 to 650 grams of styrene per liter of catalyst per hour may be obtained. Higher production ratios are possible with the titania catalyst in pellet form, e.g., chemically pure anhydrous grade titanium dioxide powder is wetted with water and the resulting paste pried at 130° to 150° C. The dried cake is powdered and then pelleted. The pellets are then fired in a furnace at a temperature of at least 800° C., and they become very strong, mechanically. Then, they may be subjected to an activation step by immersion in boiling aqueous nitric acid (18–20 percent concentration) for a period of about 90 minutes, thorough washing with water, and drying at about 130° to 150° C. Instead of nitric acid, hydrochloric acid, phosphoric acid or sulfuric acid may be used for the acid treatment. At between 800° and 1000° C., there is a shrinkage of the pellet, and the pellets are harder and denser. These denser, harder pellets do not seem to be as readily activated by nitric acid as those roasted at 800° C. even using the concentrated grade of nitric acid. They may be activated, however, by aqueous phosphoric acid of 20 percent concentration. With the denser, harder pellet dusting of the catalyst, e.g. during a charging operation, is largely eliminated, and for this purpose a roasting temperature of about 1000° C. is preferred.

In general, the smaller pellet size the better the production ratio. Pellet sizes measuring less than 3/16 inch in the largest dimension are not practical, mechanically. Good production ratios are obtained with pellets measuring up to 3/8 inch in one or more dimensions.

The desirable temperatures of dehydration are between 180° and 280° C. Usually it is necessary to use temperatures below 220° or above 250° C. At below 220° C. steam or reduced pressure may be employed to assist in vaporizing the aralkanol. Temperatures above about 250° to 280° C. may be employed with a high feed rate.

Other dehydration methods and catalysts may be used, and the dehydration can be carried out in liquid phase.

*Examples*

The following examples are presented in illustrate the invention.

*Example 1.*—There are charged to a pressure reactor equipped with an agitator about 50 grams of tertiary butyl hydroperoxide, 50 grams of tertiary butanol, 2 grams of molybdenum naphthenate which contains 2% by weight molybdenum, and 100 grams of propylene. The reaction mixture is heated to 80° C., and reacted with agitation for two hours at a pressure in the range of about 400 to 600 p.s.i.g. The reaction mixture is subjected to a distillation to separate the product propylene oxide from the remaining components of the reaction mixture. About 33.6% of the hydroperoxide is converted to produce propylene oxide in a conversion selectivity of 86%.

*Example 2.*—Example 1 is repeated using 10 grams of 77% tertiary butyl hydroperoxide, 10 grams of tertiary butyl alcohol, 0.4 gram of molybdenum naphthenate (2% by weight molybdenum) and 22 grams of propylene. Temperature is 80° C. and reaction pressure about 400 p.s.i.g.

After a reaction time of 2 hours, conversion (based on peroxide) is 33% and selectivity to propylene oxide (base on peroxide) is 94.5%.

*Example 3.*—Example 1 is repeated using 2 grams of 77% tertiary butyl hydroperoxide, 18.1 grams cyclohexanol, 0.2 gram of molybdenum naphthenate (2% by weight molybdenum) and 21.6 grams of propylene. Temperature was 80° C. and pressure was approximately 400 p.s.i.g.

After a reaction time of 2 hours, peroxide conversion is 75% and selectivity to propylene oxide based on peroxide is 52%.

*Example 4.*—Example 1 is repeated using 10 grams of tertiary butyl hydroperoxide, 9.8 grams benzene, 0.2 gram molybdenum hexacarbonyl, and 25 grams of propylene. Temperature is 80° C. and pressure about 400 p.s.i.g.

After 1½ hours reaction time, conversion is 21% and selectivity to propylene oxide essentially theoretical (both based on peroxide).

*Example 5.*—Cyclohexanol in amount of 700 grams is admixed with 7 grams of cyclohexanone peroxide and 7 grams of calcium carbonate. Oxygen is bubbled through the mixture at a rate of 0.71/min. (STP) while the temperature is rapidly raised to 120° C. After 8 liters of oxygen have been absorbed, the mixture is cooled to 110° C. and the oxidation continued until 17 liters of oxygen have been absorbed.

The process of Example 1 is repeated using about 20 grams of the cyclohexanol oxidate, 0.2 gram of molybdenum naphthenate (2% by weight molybdenum) and 16.5 grams propylene. The reaction is carried out at 80° C. and approximately 400 p.s.i.g.

After 2 hours, conversion is 87% and selectivity to propylene oxide is 44%, both based on cyclohexanol oxidate.

*Example 6.*—There are charged to a pressure reactor equipped with an agitator 35 grams of propylene and 100 grams of a solution of 50 grams practical grade t-butyl hydroperoxide and 50 grams of t-butyl alcohol which had been contacted with 10 grams MoO$_3$ for 3 hours at 35° C. and suction filtered to remove undissolved MoO$_3$. The MoO$_3$ in solution was believed to be less than 0.02 gram. The reaction mixture is heated to 110° C., and reacted without agitation for six hours at a pressure in the range of about 400 to 500 p.s.i.g. The reaction mixture is subjected to a distillation to separate the product propylene oxide from the remaining components of the reaction mixture. About 51.2% of the hydroperoxide is converted to produce propylene oxide in a conversion selectivity of greater than 86.7%.

*Example 7.*—Example 6 is repeated using 10 grams of 77% tertiary butyl hydroperoxide, 10 grams of tertiary butyl alcohol, 0.004 gram of phosphomolybdic acid and 32 grams of propylene. Temperature is 110° C. and reaction pressure about 400 p.s.i.g.

After a reaction time of 6 hours, conversion (based on peroxide) is 49.5% and selectivity to propylene oxide (based on peroxide) is greater than 88.3%.

*Example 8.*—Example 6 is repeated using 10 grams of 77% tertiary butyl hydroperoxide, 10 grams t-butyl alcohol, 0.012 gram of molybdenum trioxide and 6.4 grams of propylene. Temperature was 110° C. and pressure was approximately 400 p.s.i.g.

After a reaction time of 6 hours, peroxide conversion is 41.7% and selectivity to propylene oxide based on peroxide is 96.5%.

*Example 9.*—Example 6 is repeated using 5 grams of t-butylhydroperoxide, 5 grams of t-butyl alcohol and 6 grams of allyl alcohol. Molybdenum trioxide is employed in very small amounts.

The reaction temperature is 100° C. and the reaction is carried out for about 4 hours at a pressure in the range of about 15 to 30 p.s.i.a.

After the above four hours of reaction, the conversion based on peroxide is 24.5%, and the selectivity to glycidol based on peroxides is 92%.

*Example 10.*—There are charged to a pressure reactor equipped with an agitator 14.9 grams of propylene, 5.0 grams of t-butyl hydroperoxide, 5.0 grams of t-butyl alcohol and 0.1 gram of tungstic acid. The reaction mixture is heated to 110° C. and reacted without agitation for two hours at a pressure in the range of about 400 to 500 p.s.i.g. The reaction mixture is subjected to a distillation to separate the product propylene oxide from the remaining components of the reaction mixture. About 5.5% of the hydroperoxide is converted to produce propylene oxide in a conversion selectivity of 99.6%.

*Example 11.*—Using 3.6 gms. of 91% cumene hydroperoxide, 0.07 gram of molybdenum naphthenate solution (containing 5% Mo) and 11.4 grams of linseed oil reacted in a vessel at atmospheric pressure without agitation for 3 hours at 90° C., 92.8% of the peroxide is converted and epoxidized linseed oil is produced in at least 78.9% selectivity based on consumed peroxide.

*Example 12.*—The epoxidation is conducted essentially as described in Example 11, except using 2.5 grams of the hydroperoxide and (instead of the oil) 2.5 grams of cumene and 5.0 grams of polybutadiene resin (a solid dissolved in the cumene). The conversion is 94.6% and the selectivity to epoxy groups based on peroxide is at least 84.3%.

*Example 13.*—Following Example 1 using 11 grams of 63% ethylbenzene hydroperoxide in ethylbenzene, 29.6 grams of methyl oleate, 0.1 gram of naphthenate solution containing 5% Mo, a temperature of 80° C. and a 3 hour reaction time, the hydroperoxide conversion is 83.8% and the selectivity is greater than 89% based on mols methyl oleate epoxide formed per mol of hydroperoxide reacted.

*Example 14.*—Following Example 13 except using 5.6 grams of the hydroperoxide solution and 10.8 grams of 4-vinyl cyclohexene, with a temperature of 20° to 50° C. and a one hour reaction time, the hydro peroxide conversion is 87.7% and the selectivity is about 100% based on mols 4-vinyl cyclohexene epoxide formed per mol of hydroperoxide reacted.

In similar manner, octene-1 or dodecene-1 or hexadecene-1 is epoxidized. Selenium dioxide may be used as the catalyst.

*Example 15.*—A series of runs was made to epoxidize cyclohexene to cyclohexene oxide using alpha phenyl ethyl hydroperoxide. About 50 grams of 35 wt. percent alpha phenyl ethyl hydroperoxide in ethylbenzene were mixed with 100 grams of cyclohexene. To 5 grams samples of this mixture were added the catalyst indicated below and each sample was reacted for 1 hour at 70° C. Conversion refers to hydroperoxide conversion and selectivity to the amount of cyclohexene oxide formed based on hydroperoxide converted to another product.

TABLE I

| Run | Catalyst | Gms. | Conversion, Percent | Selectivity, Percent |
|---|---|---|---|---|
| 1 | Mo naphthenate (5 wt. percent Mo). | 0.02 | 100 | 95 |
| 2 | Tetrabutyl titanate. | 0.02 | 98 | 80 |
| 3 | Rhenium heptoxide. | 0.01 | 100 | 20 |
| 4 | Tungsten carbonyl. | 0.005 | 98 | 95 |
| 5 | Columbium acetyl acetonate. | | 51 | 95 |
| 6 | Columbium naphthenate (4.84% Cb). | 0.02 | 67 | 95 |
| 7 | Tantalum naphthenate (9.42% Ta). | 0.02 | 44 | 90 |

In each of Examples 13 through 15 and 30–33, the alpha phenyl ethanol (formed from the hydroperoxide on about a mol for mol basis) is converted in 80% or better yield to styrene by vapor phase dehydration at 200° to 250° C. over titania pellets or the like oxide catalyst at atmospheric pressure.

*Example 16.*—About 3 grams of commercial $MoO_3$ was admixed with 5 grams tertiary butyl hydroperoxide and 10 grams tertiary butanol. This mixture was heated to 75° C. for 6 hours.

The resulting mixture was filtered to remove solid $MoO_3$ and the filtrate containing a small amount of dissolved catalyst was combined with an equal weight of cyclohexene and reacted at 80° C. for 3 hours. Hydroperoxide conversion was 82% and reaction selectivity to cyclohexene oxide based on hydroperoxide was 93%.

The above was repeated using 3 grams of freshly precipitated $Cb_2O_5$ in place of the 3 grams $MoO_3$. Hydroperoxide conversion was 43% and selectivity to cyclohexene oxide based on hydroperoxide was 91%.

*Example 17.*—A series of runs was made to epoxidize propylene to propylene oxide. In each case 20 grams of a 34.6 wt. percent solution of alpha phenyl ethyl hydroperoxide in ethyl benzene was charged to a pressure reactor along with 20 grams propylene and the indicated amount of catalyst. The reaction was carried out for 1 hour at 110° C. The following table indicates the results obtained; conversion and selectivity are as indicated for Table I:

TABLE II

| Run | Catalyst | Gms. | Conversion, Percent | Selectivity, Percent |
|---|---|---|---|---|
| 1 | Mo naphthenate (5 wt. percent Mo). | 0.2 | 97.2 | 70.8 |
| 2 | Ti naphthenate (2.5 wt. percent Ti). | 0.2 | 54.0 | 55.3 |
| 3 | Ta naphthenate (9.4 wt. percent Ta). | 0.2 | 25.0 | 22.8 |
| 4 | Cb naphthenate (4.84 wt. percent Cb). | 0.2 | 22.0 | 20.0 |
| 5 | W naphthenate (5 wt. percent W). | 0.4 | 83.0 | 65.0 |

*Example 18.*—Example 17 was repeated using 20 grams of 27.5 wt. percent cumene hydroperoxide in cumyl alcohol (dimethyl phenyl carbinol) and 20 grams propylene. Using 0.1 gram tetrabutyl titanate catalyst for 1 hour reaction at 110° C., hydroperoxide conversion was 23.8% and selectivity to propylene oxide was 62.3%.

Using 0.2 gram of tetrabutyl titanate at the same conditions, conversion was 44.6% and selectivity was 61.5%.

*Examples 19–28.*—In these examples, the epoxidation of propylene is conducted by charging into a pressure reactor the stated number of grams of peroxide (e.g. C.H.P., cumene hydroperoxide), 5 grams of t-B.A., t-butyl alcohol, or the stated solvent, the stated grams of molybdenum naphthenate or other salt, containing the stated percent of Mo as naptha or other salt and the stated grams of propylene. The reaction mixture is heated to the stated ° C., and reacted without agitation for the stated time at ambient pressure. The results are given in the following table, including hydroperoxide conversion and selectivity based on the moles of propylene oxide formed per mol of hydroperoxide reacted.

In each instance, the aralkyl hydroperoxide is converted to the corresponding alcohol; i.e., cumene hydroperoxide to cumyl alcohol (dimethyl phenyl carbinol) and ethylbenzene hydroperoxide to alpha phenyl ethanol.

The epoxidation effluents are treated as described in Example 34 to separate propylene, propylene oxide and the solvent, and the aralkyl alcohol is dehydrated to the corresponding styrene; i.e., cumyl alcohol to alpha methyl styrene and alpha phenyl ethanol to styrene in high yield (80+%) as described in Example 34.

TABLE III

| Ex. | Gms. | Peroxide | Sol., gms. | Catalyst, gm. | $C_3H_6$, g. | Temp., °C. | Reaction Time, hrs. | Peroxide, percent | |
|---|---|---|---|---|---|---|---|---|---|
| | | | | | | | | Conv. | Select. |
| 19 | 5 | CHP | 5 t-B.A. | .16 g. 5% Mo naphth | 16.5 | 90 | 1.0 | 91.6 | 99.9 |
| 20 | 5 | CHP | 5 t-B.A. | .16 g. 5% Mo naphth | 15.9 | 90 | 1.0 | 93.8 | 99.1 |
| 21 | 5 | CHP | 5 t-B.A. | .16 g. 5% Hexanoate [1] | 16.7 | 90 | 1.0 | 96.5 | 87.0 |
| 22 | 5 | CHP | 5 t-B.A. | .16 g. 5% Mo naphth | 13.6 | 110 | .25 | 93.0 | 84.0 |
| 23 | 5 | CHP | 5 t-B.A. | .16 g. 5% Mo citrate | 14.8 | 90 | 1.0 | 87.6 | 86.5 |
| 24 | 5 | CHP | 5 t-B.A. | .16 g. 5% Mo oxalate | 15.8 | 90 | 1.0 | 76.4 | 75.6 |
| 25 | 5 | CHP | 5 t-B.A. | .03 g. Mo[2] | 17.2 | 90 | 1.0 | 90.3 | 75.3 |
| 26 | 3 | CHP | 7 g.[3] | .04 g. 5% Mo naphth | 14.7 | 90 | 1.0 | 92.7 | 98.4 |
| 27 | 3 | CHP | {4.5 g.[4] / 2.9[3]} | .08 g. 5% Mo naphth | 16.2 | 90 | 1.0 | 97.0 | 87.9 |
| 28 | 5 | ([5]) | 5 | 2.02% Mo naphth | 13.9 | 90 | 1.0 | 83.0 | 85.0 |

[1] Mo. [2] Acetylacetonate. [3] Cumyl alcohol. [4] Cumene. [5] Alpha phenyl ethyl hydroperoxide.

*Example 29.*—The epoxidation of propylene is conducted essentially as described in Example 28 above except that the amount of catalyst is 0.9 gram and the reaction time is 0.5 hour. The hydroperoxide conversion is 77% and the selectivity is 94% based on mols of propylene oxide formed per mol of hydroperoxide reacted.

*Example 30.*—Five grams of 88% alpha-phenyl-ethyl-hydroperoxide, 5 grams of alpha-phenyl-ethanol, 0.6 gram of molybdenum naphthenate (containing 2% Mo) and 16.0 grams of propylene are reacted in a pressure vessel without agitation for 15 minutes at 100° C. Analysis shows that 91% of the peroxide is converted and propylene oxide is produced in a 84% selectively based on consumed peroxide. The propylene to propylene oxide selectivity is 99.6%.

*Example 31.*—The epoxidation is conducted essentially as described in Example 24 except that the catalyst is .016 gram of permolybdic acid. The conversion is 92% and the selectivity based on peroxide is 52%.

Good results are obtained using molybdenum disulfide as the catalyst in such epoxidation runs.

*Example 32.*—The procedure of Example 19 is repeated except with 10 grams of a solution of the hydroperoxide of p-ethyl toluene, 16.8 grams of propylene, 0.03 gram of naphthenate containing 5% Mo, a temperature of 90° C. and a reaction time of 30 minutes. The hydroperoxide conversion is 75.5% and the selectivity is 92% based on moles propylene oxide formed per mol of hydroperoxide reacted.

*Example 33.*—The procedure of Example 26 is repeated except using 16.4 grams of propylene, 0.08 gram of the naphthenate, 80° C. temperature and a 1 hour reaction time. The hydroperoxide conversion is 92.5% and the selectivity is 83%.

*Example 34.*—Ethyl benzene is oxidized in a reactor at 130° C. and 50 p.s.i.g. by contact with air. The reaction is continued until about 13% of the ethyl benzene is reacted with 84% selectivity to alpha phenyl ethyl hydroperoxide.

Sufficient unreacted ethylbenzene is removed from the oxidation effluent by distillation to concentrate the oxidation mixture to about 34.6 wt. percent alpha phenyl ethyl hydroperoxide and the concentrated mixture is used to epoxidize propylene in a series of runs using different catalysts. In each run, 20 grams of the hydroperoxide solution is charged to a pressure reactor with 20 grams propylene and the indicated amount of catalyst. Each reaction is carried out for 1 hour at 110° C. The epoxidation results are given in the following table wherein conversion refers to the percentage of hydroperoxide reacted and selectivity is selectivity to propylene oxide based on hydroperoxide converted.

TABLE IV

| Run | Catalyst | Gms. | Conversion, Percent | Selectivity, Percent |
|---|---|---|---|---|
| 1 | Mo naphthenate (5 wt. percent Mo). | 0.2 | 97.2 | 70.8 |
| 2 | Ti naphthenate (2.5 wt. percent Ti). | 0.2 | 54.0 | 55.3 |
| 3 | Ta naphthenate (9.4 wt. percent Ta). | 0.2 | 25.0 | 22.8 |
| 4 | Cb naphthenate (5 wt. percent Cb). | 0.2 | 22.0 | 20.0 |
| 5 | W naphthenate (5 wt. percent W). | 0.4 | 83.0 | 65.0 |

In each of the above epoxidations the alpha phenyl ethyl hydroperoxide which reacts is converted substantially quantitatively to alpha phenyl ethanol.

Each epoxidation effluent is distilled to separate unreacted propylene overhead. The bottoms is then subjected to a mild liquid phase hydrogenation with hydrogen over a nickel on kieselguhr catalyst (40° C., 50 p.s.i.g.) to convert unreacted hydroperoxide to alpha phenyl ethanol. The resulting mixture is distilled and product propylene oxide separated overhead at 35° C. and about atmospheric pressure. The bottoms ethyl benzene alpha phenyl ethanol fraction is distilled to separate ethyl benzene overhead at 62° C., 60 mm. Hg, which ethylbenzene is recycled to the oxidation thereof.

The bottoms alpha phenyl ethanol fraction from each run is vaporized and dehydrated at 230° C. and about atmospheric pressure over titania pellets to styrene in 80% yield.

*Example 35.*—Cumene is oxidized in a reactor at 130° C. and 150 p.s.i.g. by contact with air. The reaction is continued until the mixture contains about 30% by weight cumene hydroperoxide. The selectivity to alpha alpha dimethyl benzyl hydroperoxide is about 93%.

The resulting hydroperoxide solution containing alpha alpha dimethyl benzyl hydroperoxide is used to epoxidize propylene. About 506 grams of hydroperoxide solution, 294 grams of propylene, 94 grams of cumyl alcohol, 1.8 grams of Mo naphthenate (containing 5% Mo), and 0.81 gram Na naphthenate (containing 2% Na) are charged to a pressure reactor. The epoxidation reaction is carried out for 2 hours at 110° C. Conversion of hydroperoxide is 99.0% and selectivity to propylene oxide is 80%. During the epoxidation the hydroperoxide which reacts is converted substantially quantitatively to cumyl alcohol (dimethyl phenyl carbinol).

The epoxidation effluent is distilled to separate unreacted propylene overhead. The bottoms is then distilled and product propylene oxide separated overhead at 35° C. and about atmospheric pressure. The bottoms cumene cumyl alcohol fraction is distilled to separate cumene overhead at 60° C., 30 mm. Hg, which cumene is recycled.

The bottoms cumyl alcohol fraction is vaporized and dehydrated at 200° C. and about atmospheric pressure over titania pellets to alpha methyl styrene in about 90% yield.

Example 36.—The aralkyl hydroperoxides are unique oxidizing agents for forming epoxides. As compared to alkyl organic hydroperoxides, such as the one from isobutane, they are several-fold faster acting and give better conversions and selectivities (based on peroxide) as shown by the following runs carried out in a manner analogous to the following examples using 5 grams of the hydroperoxide, 5 grams of the corresponding alcohol as diluent, 0.4 gram of molybdenum naphthenate (containing 2% Mo) and 90° C. (except the last isobutane 130° C.):

TABLE V

| Hydroperoxide from— | $C_3H_6$, gm. | Time of Run, hr. | Perox. Conv., percent | Selectivity, percent |
|---|---|---|---|---|
| Ethylbenzene (perox. 90% pure) | 13.9 | 0.5 | 77.5 | 90 |
| Cumene (90% pure) | 14.7 | 1.0 | 92.7 | 98 |
| Isobutane (80% pure) | 16.1 | 3.0 | 49.5 | 75 |
| Isobutane | 15.7 | 3.0 | 83.9 | 49 |

For an alkyl hydroperoxide system such as t-butyl hydroperoxide in t-butanol, the selectivity drops in about a straight line relationship from about 89% to about 38% as the peroxide conversion is increased from about 30% to about 98%. However, in an aralkyl hydroperoxide system such as ethylbenzene hydroperoxide in ethylbenzene or cumene hydroperoxide, the selectivity drops only a few points where conversion is increased from 40% to about 98% conversion. Therefore, good yields are obtained, even with about complete conversion, minimizing or avoiding recovery and/or recycling of hydroperoxide.

Again, in contrast to the alkyl type, the stated aralkyl hydrocarbons are oxidized to the hydroperoxide at a faster rate, to higher conversions and with greater selectivity.

Example 37.—There were charged to a reactor 65 grams of liquid charge consisting by weight of 12.9% cumene hydroperoxide, 18.5% cumene, 33.7% cumyl alcohol, 34.5% propylene, and 0.4% molybdenum naphthenate (containing 5% Mo). Also included in the charge was 0.285 gram of sodium naphthenate in cumene containing 0.84% sodium thus providing 50 mol percent sodium based on the molybdenum. The reaction time was three hours and the reaction temperature was 90° C. Conversion of cumene hydroperoxide was 94.9% and the selectivity to propylene oxide was 91% (based on hydroperoxide).

By way of contrast, when the run was repeated, for one hour at 90° C. except that no sodium naphthenate was added, 94.4% of the cumene hydroperoxide reacted with 72.5% selectivity to propylene oxide.

In the above runs, the epoxidation product mixtures were distilled to separate product propylene oxide. At a distillation pot temperature of 130° C. in the run without sodium naphthenate all of the cumene hydroperoxide in the mixture was decomposed to cumyl alcohol and also to acetophenone and phenol. This latter decomposition is particularly undesirable since the $C_9$ structure is lost thus preventing reuse of the material. Additionally, a high percentage of the cumyl alcohol contained in the mixture was dehydrated to alpha methyl styrene which is undesirable at this point due to polymer formation.

In the run wherein sodium naphthenate was employed at the same distillation pot temperature only 30% of the unreacted cumene hydroperoxide was decomposed. Also there was substantially no dehydration of cumyl alcohol.

Example 38.—The procedure of Example 37 was repeated in a series of runs each using a charge mixture containing 12.9% cumene hydroperoxide, 18.4% cumene, 33.8% cumene alcohol, 34.5% propylene, 0.4% molybdenum naphthenate (containing 5% Mo). In the different runs varying amounts of sodium naphthenate were employed. All the runs were carried out at 90° C. The following table shows the results obtained:

TABLE VI

| Run No. | Mol Percent [1] Sodium as Naphthenate | Time, hours | Cumene Hydroperoxide Conversion, Percent | Selectivity [2] to Propylene Oxide, Percent |
|---|---|---|---|---|
| 1 | 0 | 1 | 92.3 | 70.6 |
| 2 | 25 | 1 | 82.9 | 81.2 |
| 3 | 50 | 2 | 89.6 | 100.0 |
| 4 | 100 | 2 | 18.8 | 93.2 |

[1] Based on Mo.
[2] Based on hydroperoxide converted.

Example 39.—The procedure of Example 37 was repeated in a series of runs each using a charge mixture containing 46.4% of cumene oxidate, containing 42.2% cumene hydroperoxide, 26.2% cumyl alcohol, 27% propylene, and 0.4% molybdenum naphthenate. In the different runs various alkali and alkaline earth metal naphthenates were used. Runs 1–5 were at 90° C., runs 6–18 at 100° C. The following table shows the results obtained:

TABLE VII

| Run No. | Mol Percent Metal Naphthenate as Based on Mo | Time, hours | Cumene Hydroperoxide Conversion, Percent | Selectivity to Propylene Oxide, Percent |
|---|---|---|---|---|
| 1 | 0 | 2 | 72.0 | 43.6 |
| 2 | 50-Li | 2 | 85.8 | 59.3 |
| 3 | 50-K | 2 | 74.3 | 60.2 |
| 4 | 50-Mg | 2 | 73.2 | 51.3 |
| 5 | 50-Ca | 2 | 71.6 | 57.7 |
| 6 | 0 | 2.5 | 94.9 | 42.8 |
| 7 | 100-Li | 2.5 | 97.8 | 66.6 |
| 8 | 100-Na | 2.5 | 89.9 | 79.6 |
| 9 | 100-K | 2.5 | 88.0 | 89.7 |
| 10 | 100-Mg | 2.5 | 90.0 | 52.9 |
| 11 | 100-Ca | 2.5 | 85.9 | 61.8 |
| 12 | 0 | 2.5 | 95.6 | 58.6 |
| 13 | 50-Li | 2.5 | 97.8 | 45.8 |
| 14 | 50-Na | 2.5 | 86.8 | 65.5 |
| 15 | 50-K | 2.5 | 89.6 | 67.2 |
| 16 | 50-Mg | 2.5 | 90.7 | 51.7 |
| 17 | 50-Ca | 2.5 | 91.3 | 52.3 |
| 18 | 150-Li | 2.5 | 93.7 | 70.3 |

Example 40.—The procedure of Example 37 was repeated using a charge of 50 grams of 14% ethylbenzene hydroperoxide in ethylbenzene, 10.5 grams of propylene and 0.2 gram of 5% molybdenum naphthenate. The reaction time was one hour at 90° C. About 0.27 gram of potassium naphthenate in cumene containing 1.5% potassium was used thus providing 100% mol percent potassium as the naphthenate based on molybdenum; conversion of hydroperoxide was 91.5% with 89.8% selectivity to propylene oxide. Without the potassium naphthenate, hydroperoxide conversion was 92.4% with 78.6% selectivity to propylene oxide.

Example 41.—The procedure of Example 37 was repeated using a charge of 10 grams tertiary butyl hydroperoxide, 10 grams tertiary butyl alcohol, 10 grams butene-1 and 0.2 gram of 5% molybdenum naphthenate. Reaction time was 3 hours and reaction temperature was 130° C. Using 100 mol percent potassium as the naphthenate based on molybdenum, conversion of hydroperoxide was 98.4% with 78.9% selectivity to butene epoxide. Without the potassium naphthenate, hydroperoxide conversion was 99.3% with 49.6% selectivity to the epoxide.

Example 42.—The procedure of Example 37 was repeated using a charge of 31.2% cumene oxidate containing 42.2% cumene hydroperoxide, 33.8% cumyl alcohol, 34.6% propylene, and 0.4% of 5% molybdenum naphthenate. A series of runs was made at 110° C. using powdered MgCO₃ additive. The following table shows the results obtained:

TABLE VIII

| Run No. | Mol Percent MgCO₃ Based on Mo | Time, hours | Cumene Hydroperoxide Conversion | Selectivity to Propylene Oxide, Percent |
|---|---|---|---|---|
| 23 | 0 | 0.5 | 99.6 | 53.4 |
| 24 | 100 | 1.5 | 99.7 | 79.8 |
| 25 | 1,000 | 1.5 | 99.8 | 67.2 |

The above results very clearly demonstrate the real and important improvement in the efficiency of the use of the hydroperoxide in formation of the corresponding oxirane compound through use of basic additives.

*Example 43.*—Propylene is continuously converted to propylene oxide in an elongated, tubular reactor.

A charge mixture of 1590 g./hr. propylene, 480 g./hr. cumene hydroperoxide, 480 g./hr. t-butyl alcohol, and 16 g./hr. molybdenum naphthenate containing 5% Mo is continuously introduced into the inlet end of the reactor. The reactor is a stainless steel tube 5 feet in length having an inner diameter of 1½ inches.

Two injection lines are located along the reactor 1.67 feet and 3.34 feet respectively from the feed end. The reactor is provided with a jacket adapted to regulate reaction temperature. The reaction temperature is maintained at 90° C.

During the reaction, cumene hydroperoxide is added through the two injection lines at rates respectively of 520 g./hr. and 529 g./hr. The product mixture is removed from the exit end of the reactor and is distilled for recovery of the various components.

Through practice of the invention hydroperoxide conversion is 78.8% and selectivity to propylene oxide is 72.6% feed on peroxide. Additionally, 96% of the cumene hydroperoxide can be recovered as cumyl alcohol.

By way of contrast in similar operation but with shorter reaction time, where all hydroperoxide is added in the initial feed, hydroperoxide conversion is 78.8% but selectivity to propylene oxide is 39.2%. Also only 85% of the cumene hydroperoxide is recoverable as cumyl alcohol, the rest being converted to products having a different carbon structure.

*Example 44.*—Hexene-1 is converted to hexane epoxide by reaction with tertiary butyl hydroperoxide in a batch system.

A stirred batch reactor is charged with 126 grams hexene-1, 45 grams tertiary butanol, 30 grams tertiary butyl hydroperoxide, and 1.0 gram molybdenum naphthenate containing 5% molybdenum. The mixture is heated to 110° C. reaction temperature.

Thereafter, at 10 minute intervals, 5 gram portions of tertiary butyl hydroxide are added to the reactor. A total of 60 grams tertiary butyl hydroperoxide is added in this manner.

After 180 minutes reaction time, the reaction mixture is removed from the reaction and distilled for the separation of the various components.

Conversion of hydroperoxide is 74% with 97% selectivity to epoxide based on peroxide.

By way of contrast, where all hydroperoxide is initially charged to the reactor, but a 60 minute residence time, hydroperoxide conversion is 78% and selectivity to epoxide is 82%.

*Example 45.*—A series of batch runs were made for the epoxidation of propylene ($C_3$) using cumene hydroperoxide (CHP), tertiary butyl alcohol solvent (BA), and molybdenum naphthenate (5% molybdenum catalyst). All runs were at 90° C. The following table shows the results obtained:

TABLE IX

| Run No. | CHP | BA | C₃ | Cat. | Time, hour | C₃/CHP, Mol Ratio | CHP Conversion, Percent | Selectivity to Epoxide, Percent | Recoverable as Alcohol, Percent |
|---|---|---|---|---|---|---|---|---|---|
| 1 | 5.0 | 5.0 | 16.9 | .16 | 1 | 13.6 | 94.0 | 85.4 | 97.0 |
| 2 | 4.7 / 5.3 | 4.7 | 15.9 | .16 | 1 / 1 | 6.4 | 87.2 | 81.6 | 97.0 |
| 3 | 7.0 | 3.0 | 15.1 | .16 | 1 | 7.8 | 82.6 | 74.4 | 81.0 |
| 4 | 5.0 / 4.92 / 4.92 | 10 | 8.7 | .16 | 1 / 1 / 1 | 2.1 | 75.8 | 62.3 | 94.0 |

A comparison of Runs 1 and 3 with Runs 2 and 4 clearly show the advantages of the incremental addition. Thus, with the incremental hydroperoxide addition, high reaction selectivities are attainable at lower overall unsaturated compound to hydroperoxide ratios. Also, there is reduced loss of cumene C₉ structure. The hydroperoxide is converted with high selectivity to the alcohol which can be recovered and converted back to hydroperoxide.

*Example 46.*—An epoxidation mixture of 7.3 grams propylene, 5 grams t-butyl hydroperoxide, 5 grams t-butyl alcohol, and 0.2 gram molybdenum naphthenate (5.0 wt. percent Mo) was reacted for 10 minutes. During a predominance of the reaction the temperature was about 170° C. Hydroperoxide conversion was 78.5% and selectivity to propylene oxide was 52%.

*Example 47.*—In order to illustrate the surprising nature of the invention as compared with prior work, runs were made comparing catalysts of this invention with the $V_2O_5$ taught by Hawkins and comparing the organic hydroperoxides of this invention with hydrogen peroxide as taught by prior workers, using catalysts of this invention.

Experiments for the epoxidation of propylene to propylene oxide were performed using aralkyl hydroperoxide and various catalysts. The following table presents runs which are generally illustrative of the results obtained in a great number of experiments. In the runs given below, the propylene in the specified amount was contacted with the specified amounts of 89% cumene hydroperoxide, isopropanol solvent and catalyst in an autoclave for the specified time at the specified temperature. The hydroperoxide conversion is given as is the selectivity (based on hydroperoxide) to propylene oxide as determined by analysis of the product mixture.

TABLE X

| Run | 1 | 2 | 3 | 4 | 5 |
|---|---|---|---|---|---|
| Propylene, gms | 17 | 17 | 17 | 17 | 17 |
| Hydroperoxide, gms | 9 | 9 | 9 | 9 | 9 |
| Solvent, gms | 24 | 24 | 24 | 24 | 24 |
| Catalyst, gms | [1] 0.1 | [2] 0.0125 | [3] .1 | [4] .1 | |
| Time hrs | 1 | 1 | 1 | 1 | 1 |
| Temp., °C | 110 | 110 | 110 | 110 | 110 |
| Hydroperoxide Conver., percent | 98 | 96 | 43 | 34 | 21 |
| Selectivity, percent | 87 | 73 | 71 | 6 | 4 |

[1] Mo Napth (5% Mo). [2] W Carbonyl. [3] $MoO_3$. [4] $V_2O_5$.

These data show propylene oxide yields by the invention of more than 40 times the yields achieved with $V_2O_5$. The yields with $V_2O_5$ were little better than those with no catalyst.

Experiments for the epoxidation of propylene to propylene oxide were performed using aqueous hydrogen peroxide and various catalysts. The following table presents the results of these experiments. In the runs given below, the propylene was contacted with the hydrogen peroxide, t-butyl alcohol solvent and catalyst in an autoclave for the specified time at the specified temperature. The hydrogen peroxide conversion is given as is the selectivity (based on peroxide) to propylene oxide as determined by analysis of the product mixture. In Runs 1 to 8 the charge was 10.5 grams propylene, 5.65

TABLE XI

| Run | Catalyst | Amt., gms. | Time, hrs. | Temp., °C | Conversion, percent | Selectivity, percent |
|---|---|---|---|---|---|---|
| 1 | $MoO_3$ | 0.75 | 2 | 70 | 40.0 | 1.1 |
| 2 | $WO_3$ | 0.75 | 2 | 70 | 37.5 | 1.4 |
| 3 | Mo Naph (5% Mo) | 0.2 | 2 | 70 | 25.6 | 2.5 |
| 4 | W Naph (5% W) | 0.2 | 2 | 70 | 86.3 | 0.63 |
| 5 | $MoO_3$ | 0.75 | 4 | 50 | 26.8 | 1.2 |
| 6 | $WO_3$ | 0.75 | 4 | 50 | 27.5 | 0.41 |
| 7 | Mo Naph (5% Mo) | 0.2 | 4 | 50 | 31.3 | 1.7 |
| 8 | W Naph (5% W) | 0.2 | 4 | 50 | 65.7 | 0.42 |
| 9 | $MoO_3$ | 0.25 | 3 | 110 | 87.9 | Trace. |
| 10 | $WO_3$ | 0.25 | 3 | 110 | 89.3 | Trace. | grams of 31.5% aqueous $H_2O_2$ and 33.15 grams t-butanol. In Runs 9 and 10 the charge was 14.0 grams propylene, 2.86 grams of 30% aqueous $H_2O_2$, and 7.14 grams t-butanol.

These runs demonstrate the ineffectiveness of hydrogen peroxide in epoxidations using the catalysts of the present invention, and establish that organic hydroperoxides and hydrogen peroxide are fundamentally different in such epoxidations. By this invention propylene oxide yields of more than 140 times those using hydrogen peroxide can be obtained.

What is claimed is:

1. The method of preparing an oxirane compound which comprises reacting an olefinically unsaturated compound with an organic hydroperoxide in the presence of a catalyst selected from the group consisting of a compound of molybdenum, tungsten, titanium, columbium, tantalum, rhenium, selenium, chromium, zirconium, tellurium and uranium.

2. The method of preparing propylene oxide which comprises reacting propylene with an organic hydroperoxide in the presence of a molybdenum compound catalyst.

3. The method of preparing propylene oxide which comprises reacting propylene with an organic hydroperoxide in the presence of a tungsten compound catalyst.

4. The method of preparing propylene oxide which comprises reacting propylene with an organic hydroperoxide in the presence of a titanium compound catalyst.

5. The method of claim 1 wherein the reaction is carried out in the presence of a basic compound.

6. The method of claim 1 wherein the hydroperoxide is added incrementally during the reaction.

7. The method of claim 1 wherein the reaction is carried out at −20 to 200° C.

8. The method of claim 1 wherein said catalyst is selected from the group consisting of a compound of molybdenum, tungsten and titanium.

9. The method of claim 1 wherein said catalyst is selected from the group consisting of a compound of columbium, tantalum, rhenium and selenium.

References Cited

UNITED STATES PATENTS

| | | | |
|---|---|---|---|
| 3,013,024 | 8/1958 | Payne | 260—348.5 |
| 3,062,841 | 11/1962 | Yang et al. | 260—348.5 |

OTHER REFERENCES

Hawkins, E. G. E.: Jour. Chem. Soc. (London) (1950) pp. 2169–2173.

Yang et al.: Jour Am. Chem. Soc. (1958) vol. 80, pp. 5845–8.

WALTER A. MODANCE, *Primary Examiner.*

N. S. MILESTONE, *Assistant Examiner.*